US010897913B1

(12) United States Patent
Blessing

(10) Patent No.: US 10,897,913 B1
(45) Date of Patent: Jan. 26, 2021

(54) AUTOMATIC WAFFLE CONE SHAPER

(71) Applicant: Dan Blessing, Lahaina, HI (US)

(72) Inventor: Dan Blessing, Lahaina, HI (US)

( * ) Notice: Subject to any disclaimer, the term of this patent is extended or adjusted under 35 U.S.C. 154(b) by 285 days.

(21) Appl. No.: 16/159,501

(22) Filed: Oct. 12, 2018

Related U.S. Application Data

(60) Provisional application No. 62/588,845, filed on Nov. 20, 2017.

(51) Int. Cl.
*A21C 15/02* (2006.01)

(52) U.S. Cl.
CPC .................................. *A21C 15/025* (2013.01)

(58) Field of Classification Search
CPC ...... A47J 37/0611; A21B 3/132; A21B 5/026; A21C 11/00; A21C 15/025; A21C 3/06; A21C 3/065; A21D 8/00; A21D 13/33; A23P 20/20; A23P 30/10
USPC ......... 99/372, 374, 376, 377, 380–383, 384, 99/426, 427, 428, 430, 431, 432, 433, 99/439, 442
See application file for complete search history.

(56) References Cited

U.S. PATENT DOCUMENTS

| | | | | |
|---|---|---|---|---|
| 1,310,990 | A | * | 7/1919 | Hauge ..................... A21B 5/026 99/373 |
| 1,440,851 | A | * | 1/1923 | Tatosian ............... A21C 15/025 425/334 |
| 1,540,041 | A | * | 6/1925 | Tatosian ................. A21B 5/023 99/373 |
| 1,720,304 | A | * | 7/1929 | Taylor .................. A21C 15/025 425/214 |
| 2,108,298 | A | * | 2/1938 | Scharf .................. A47J 37/0611 99/325 |
| 3,269,335 | A | * | 8/1966 | Heyman ............... A21C 15/025 425/391 |
| 4,624,855 | A | * | 11/1986 | Haas, Sr. ................ A21B 5/026 426/501 |
| 4,927,656 | A | * | 5/1990 | Ito .......................... A21B 5/023 426/138 |
| 5,336,511 | A | * | 8/1994 | Der Beek .............. A21B 5/026 425/414 |
| 5,518,748 | A | * | 5/1996 | Ito .......................... A21B 5/026 426/138 |

(Continued)

FOREIGN PATENT DOCUMENTS

CN            102165132 B  *  5/2015  ............... E06B 9/68

OTHER PUBLICATIONS

English translation of CN-102165132-B (Year: 2015).*

*Primary Examiner* — Christopher M Koehler
*Assistant Examiner* — Chris Q Liu
(74) *Attorney, Agent, or Firm* — Plager Schack LLP

(57) ABSTRACT

An automated waffle cone shaper for shaping waffle cones may include a mounting plate; a slide rail mounted to a top surface of the mounting plate, the slide rail including a slide carriage slidably mounted thereon; a tray attached to the slide carriage, such that when the slide carriage slides along a length of the slide rail, the tray moves along a length of the mounting plate, wherein the tray comprises a waffle feed portion and a cone shaper mold extending from the waffle feed portion; a motor and gearbox operatively attached to an end of the mounting plate distal from the slide rail; and a cone shaping spindle operatively attached to the motor, such that when the motor is activated, the cone shaping spindle rotates.

9 Claims, 5 Drawing Sheets

(56) References Cited

U.S. PATENT DOCUMENTS

| | | | | |
|---|---|---|---|---|
| 6,227,103 B1* | 5/2001 | Haas | ............... | A21C 15/025 |
| | | | | 99/354 |
| 2015/0201625 A1* | 7/2015 | Goldstein | ............ | A21C 15/025 |
| | | | | 426/500 |
| 2016/0165900 A1* | 6/2016 | Haas | ............... | A21C 15/025 |
| | | | | 425/185 |

* cited by examiner

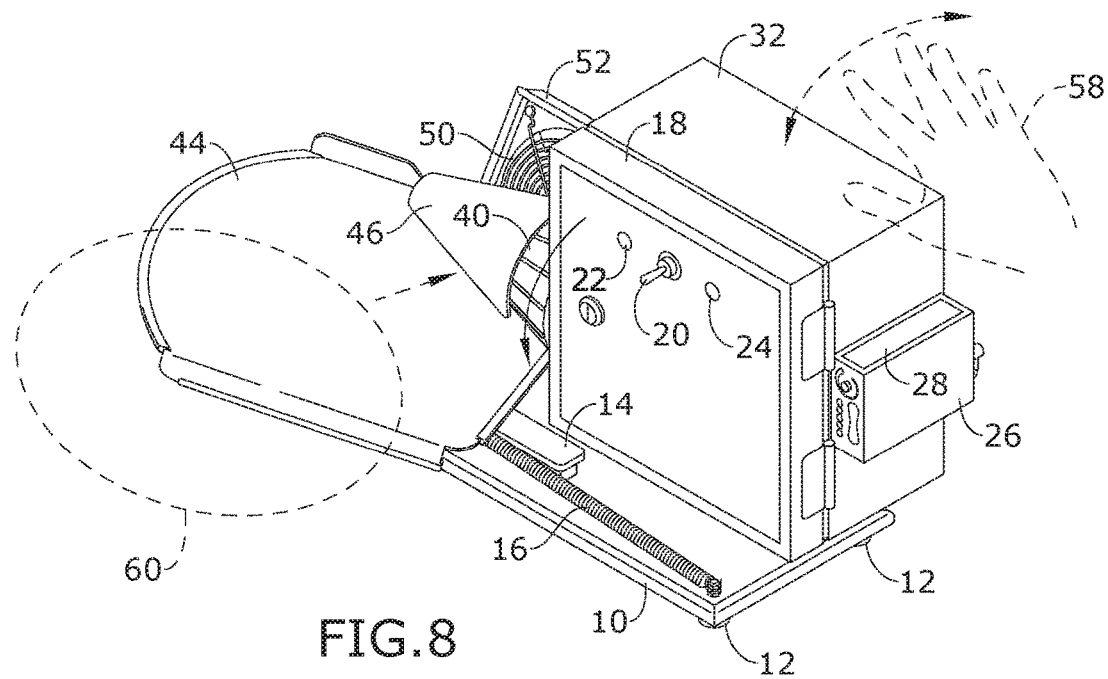

FIG.8

| THE USER TURNS THE POWER ON; THE "POWER" LIGHT TURNS ON AND THE FAN BEGINS RUNNING |
|---|
| WHEN READY TO SHAPE, THE USER WAVES THEIR HAND NEAR THE SENSOR |
| THE SENSOR SIGNALS THE MOTOR TO BEGIN SPINNING THE SPINDLE; THE "RUN" LIGHT TURNS ON AND THE TIMER STARTS |
| WITH THE SPINDLE SPINNING, THE USER PLACES THE ROUND WAFFLE ONTO THE TRAY |
| THE WAFFLE IS PULLED AROUND THE TURNING SPINDLE, FORMING A CONE SHAPE |
| WHEN THE SET TIME HAS ELAPSED, THE MOTOR STOPS RUNNING; THE "RUN" LIGHT TURNS OFF |
| THE USER RETRACTS THE TRAY AND REMOVES THE CONE, THEN RETURNS THE TRAY TO THE LOADING POSITION |
| THE USER MAY TRIGGER THE SENSOR TO SHAPE ANOTHER CONE OR POWER OFF THE MACHINE IF DONE SHAPING |

AUTOMATIC WAFFLE CONE SHAPER

RELATED APPLICATION

This application claims priority to provisional patent application U.S. Ser. No. 62/588,845 filed on Nov. 20, 2017, the entire contents of which is herein incorporated by reference.

BACKGROUND

The embodiments herein relate generally to food manufacturing, and more particularly, to an automated waffle cone shaper.

In small ice scream shops or similar type shops, homemade waffle cones are shaping by manually rolling and shaping. Specifically, the waffle is baked and then immediately transferred to a cone shaper with a shaper spindle that must be manually rotated by a user. For each cone, a user may have to rotate the spindle about 10 times. Not only does this manual requirement prevent the user from completing other tasks, such as starting to bake the next waffle, but it also can lead to injuries due to the repetitive rotating motion.

Existing automated systems are designed for industrial operations that make thousands of cones per day and are too large and too expensive for local and small retail shops.

Therefore, what is needed is an automated waffle cone shaper that is smaller in size and less expensive than industrial-sized systems.

SUMMARY

Some embodiments of the present disclosure include an automated waffle cone shaper for shaping waffle cones. The automated waffle cone shaper may include a mounting plate; a slide rail mounted to a top surface of the mounting plate, the slide rail including a slide carriage slidably mounted thereon; a tray attached to the slide carriage, such that when the slide carriage slides along a length of the slide rail, the tray moves along a length of the mounting plate, wherein the tray comprises a waffle feed portion and a cone shaper mold extending from the waffle feed portion; a motor and gearbox operatively attached to an end of the mounting plate distal from the slide rail; and a cone shaping spindle operatively attached to the motor, such that when the motor is activated, the cone shaping spindle rotates.

BRIEF DESCRIPTION OF THE FIGURES

The detailed description of some embodiments of the invention is made below with reference to the accompanying figures, wherein like numerals represent corresponding parts of the figures.

FIG. 8 is a perspective view of one embodiment of the present disclosure.

FIG. 9 is a flow chart describing the use of one embodiment of the present disclosure.

DETAILED DESCRIPTION OF CERTAIN EMBODIMENTS

Figure 1:
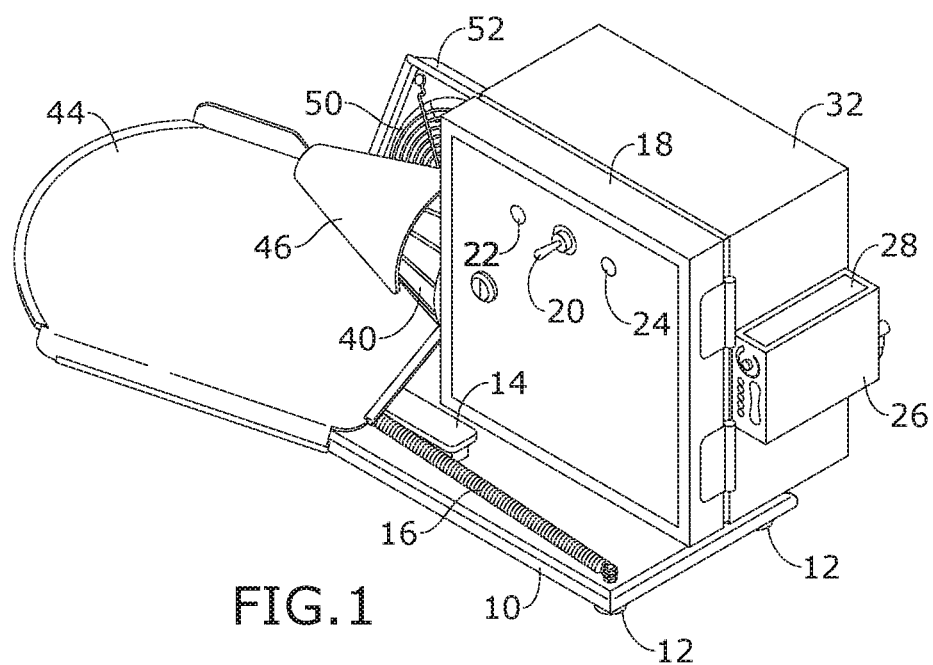
FIG. 1 is a front perspective view of one embodiment of the present disclosure.
Figure 2:
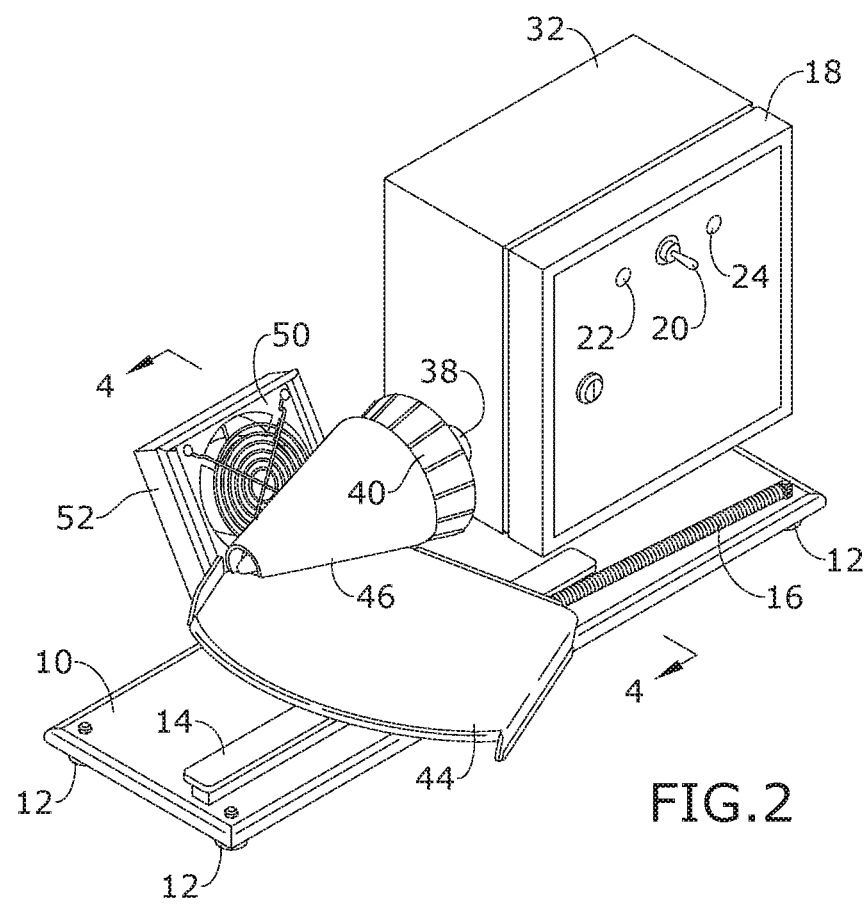
FIG. 2 is a rear perspective view of one embodiment of the present disclosure.
Figure 3:
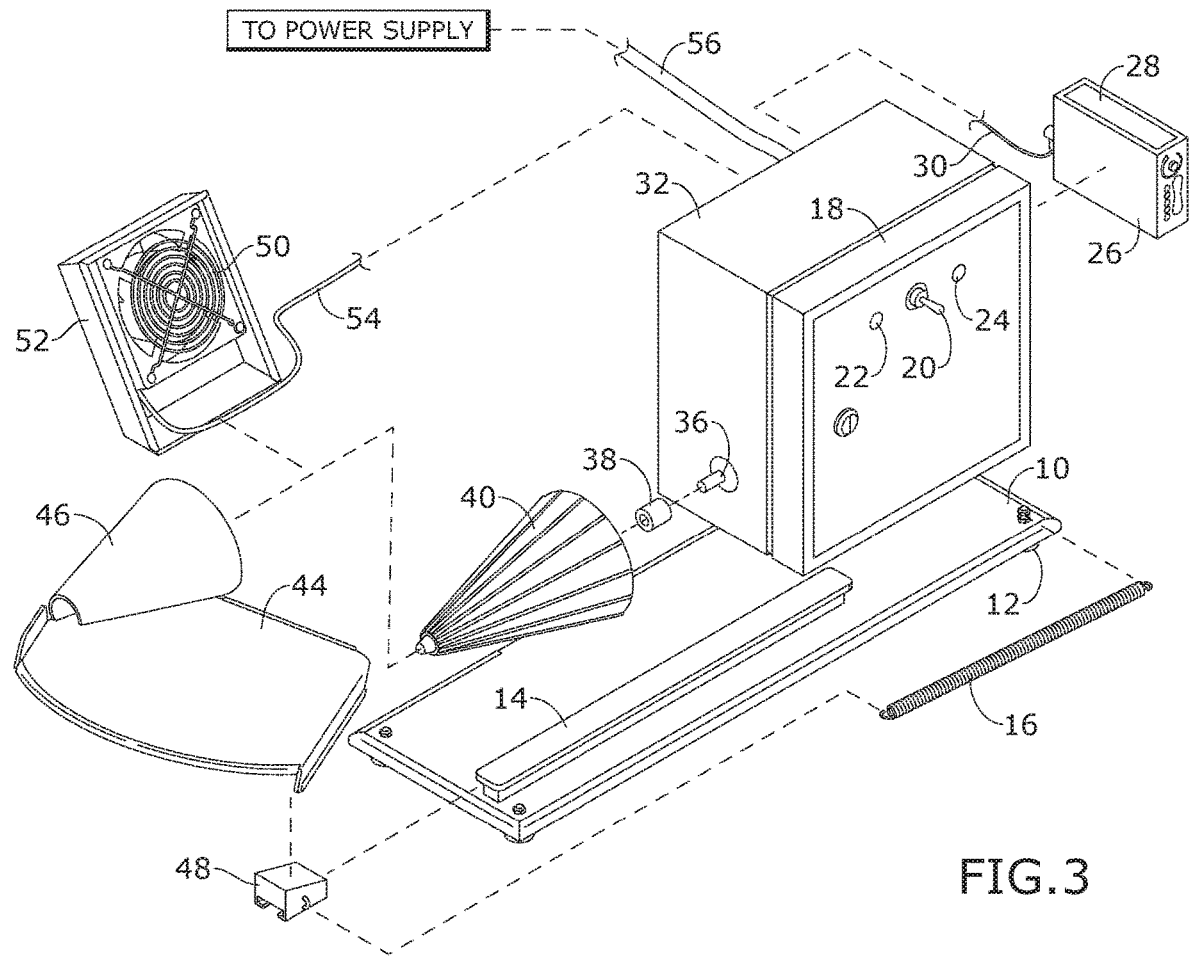
FIG. 3 is a partial exploded view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to shape waffle cones and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

| | |
|---|---|
| a. | Mounting Plate |
| b. | Self-Aligning Feet |
| c. | Slide Carriage and Rail |
| d. | Return Spring |
| e. | Control Box |
| f. | Photoelectric Sensor |
| g. | Motor and Gearbox |
| h. | Shaft Coupler |
| i. | Tray with Cone Shaper Mold |
| j. | Cone shaping spindle |

The various elements of the device of the present disclosure may be related in the following exemplary fashion. It is not intended to limit the scope or nature of the relationships between the various elements and the following examples are presented as illustrative examples only.

By way of example, and referring to FIGS. 1-10, some embodiments of the present disclosure include an automated waffle cone shaper designed to sense the presence of a user, automatically turn on, take the cone from the user and pull it into a former that shapes and cools the cones. Instead of having capabilities to sense the user, some embodiments of the automated waffle cone shaper may include an on-off switch or other known and similar activation mechanism.

The automated waffle cone shaper may comprise a mounting plate 10, feet, such as adjustable self-aligning feet 12, mounted to a bottom surface of the mounting plate 10, a slide rail 14 mounted to a top surface of the mounting plate 10, the slide rail 14 including a slide carriage 48 slidably mounted thereon, a tray 44 attached to the slide carriage 48, such that when the slide carriage 48 slides along a length of the slide rail 14, the tray 44 moves along a length of the mounting plate 10, wherein the tray 44 comprises a flat waffle feed portion and a cone shaper mold 46 extending from the flat waffle feed portion, a motor and gearbox 32 operatively attached to an end of the mounting plate 10 distal from the slide rail 14, a motor shaft 36 extending outward from the motor and gearbox 32, a shaft coupler 38 engaged with the motor shaft 36, the shaft coupler 38 designed to rotate when the motor 34 within the motor and gearbox 32 is activated, and a cone shaping spindle 40 attached to a spindle shaft 42 extending from an end of the shaft coupler 38 distal from the motor and gearbox 32, such that when the shaft coupler 38 rotates, the cone shaping spindle 40 also rotates and wherein the cone shaping spindle 40 has a size slightly smaller than the cone shaper mold 46 such that the cone shaping spindle 40 fits within the cone shaper mold 46. As shown in the Figures, the motor and gearbox 32 may be operatively attached to a power source via a power cord 56, such that when the power cord 56 provides power to the motor and gearbox 32, the motor shaft 36 and thus the shaft coupler 38 and cone shaping spindle 40 begin spinning. A waffle 60 may be placed on the tray 44 and slid into the cone shaper mold 46, wherein the rotation of the cone shaping spindle 40 may pull the waffle 60 into the cone shaper mold 46 and continue spinning to form and set the waffle 60 into the traditional cone-shape. After a sufficient period of time, the cone shaping spindle 10 may stop rotating. At such time, the user 58 may slide the tray 44 down the slide rail 14 away from the cone shaping spindle 40 to remove the waffle cone from the cone shaper mold 46.

Figure 10:
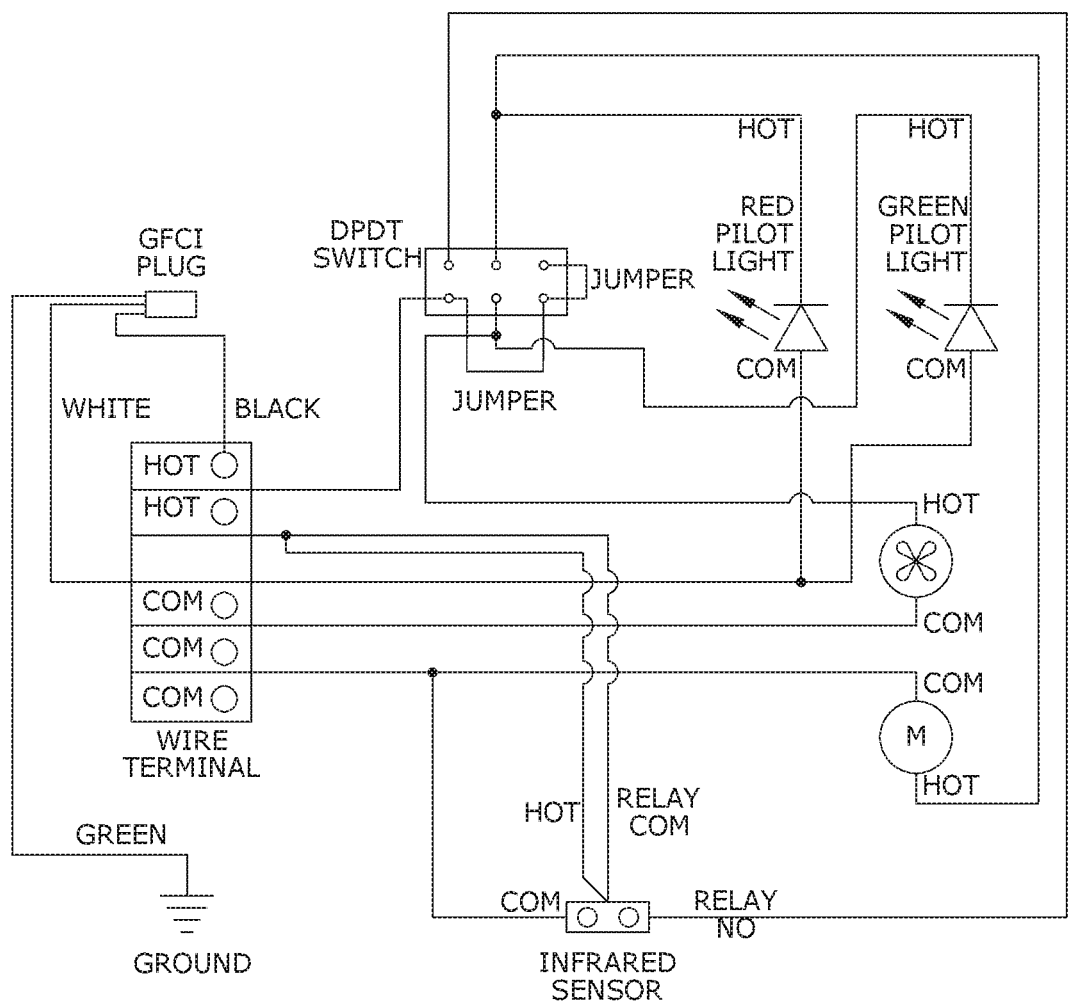
FIG. 10 is a wiring diagram of one embodiment of the present disclosure.

In embodiments, the automated waffle cone shaper may further comprise a control box 18, optionally with a power light 22, run light 24, and switches 20 or buttons, operatively attached to the motor and gearbox 32. The power light 22 may illuminate when the motor and gearbox 32 and control box 18 receive power, while the run light 24 may illuminate when the motor 34 receives power and causes the motor shaft 36 to spin. The switch 20 may be designed to allow a user to completely turn off the automated waffle cone shaper without having to unplug it from a power source. A photoelectric sensor 26 with a timer relay may also be operatively attached to the motor and gearbox 32 using, for example, sensor wiring 30, such that when a sensor region 28 of the photoelectric sensor 26 senses a user, power is sent to the motor and gearbox 32, causing the motor and thus the motor shaft 36, shat coupler 38, and cone shaping spindle 40 to rotate. An exemplary wiring diagram showing an example of the connections of the motor and gearbox 32, the control box 18, and the photoelectric sensor 26 is illustrated in FIG. 10. The electric components may be operatively attached to one another by appropriate wires and cables. In some embodiments, a separator may separate the motor and electrical plastic.

In embodiments, the automated waffle cone shaper may further comprise a return spring 16 attaching the tray 44 to a portion of the mounting plate 10 distal from the slide rail 14. The return spring 16 may prevent the tray 44 from moving away from the cone shaping spindle 40 unless purposely slide along the slide rail 14 by a user. In yet a further embodiment, the tray 44 may include a slide knob (not shown) that a user may grasp to slide the tray 44 away from the cone shaping spindle 40.

Figure 4:
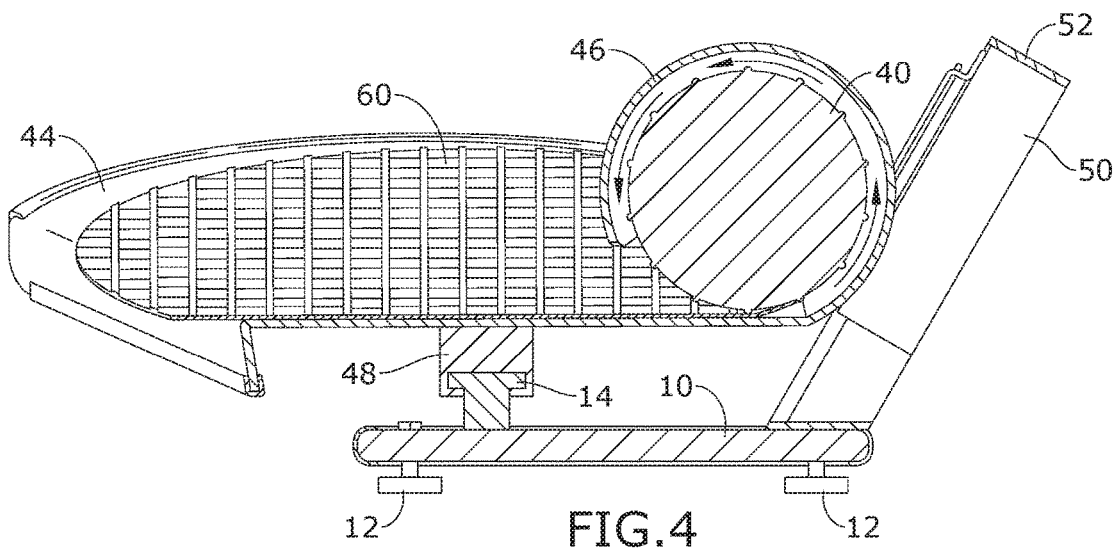
FIG. 4 is a section view of one embodiment of the present disclosure, taken along line 4-4 in FIG. 2.
Figure 5:
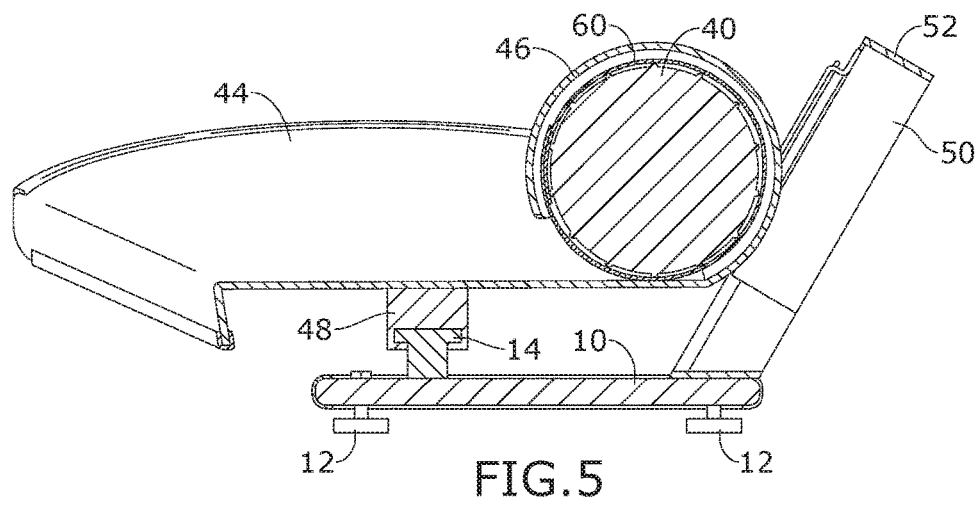
FIG. 5 is a section view of one embodiment of the present disclosure.
Figure 6:
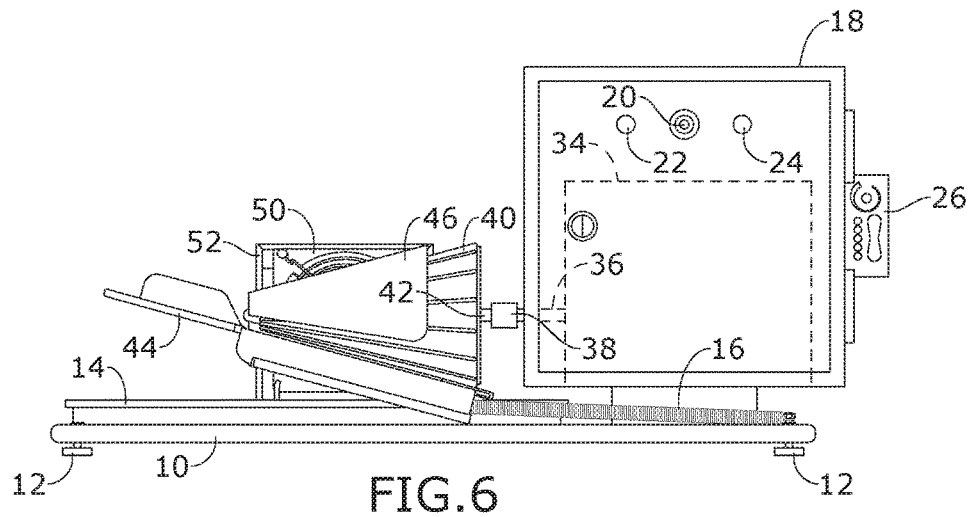
FIG. 6 is a front view of one embodiment of the present disclosure.
Figure 7:
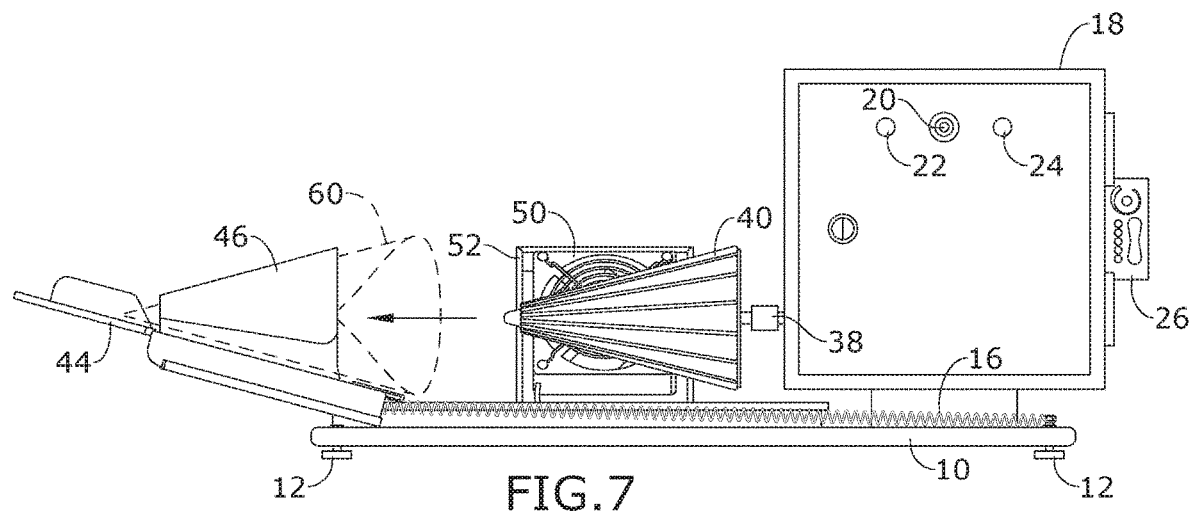
FIG. 7 is a front view of one embodiment of the present disclosure.

Embodiments of the automated waffle cone shaper may also comprise a cooling fan 50 mounted to the mounting plate 10. Specifically, the cooling fan 50 may comprise a fan mounting frame 52 surrounding the cooling fan 50, wherein the fan mounting frame 52 is attached to the mounting plate 10. In some embodiments, and as shown in FIG. 4, the fan mounting frame 52 may be attached to the mounting plate 10 at an angle, such that it leans outwards away from a central area of the mounting plate 10. The cooling fan 50 may be positioned such that the cooling fan 50 blows air toward the cone shaping spindle 40 and cone shaper mold 46 during use. Fan wiring 54 may attach the cooling fan 10 to the motor and gearbox 32, the control box 18, or other desired electrical component. In embodiments, when the motor is powered on, the cooling fan 52 is also powered on.

Each of the components of the automated waffle cone shaper may be mounted to the mounting plate 10 via mounting blocks. For example, the control box 18 may be mounted to the mounting plate 10 via a control box mounting block and the photoelectric sensor 28 may be mounted to the control box 18 or the mounting plate 10 via a photoelectric mounting block or plate. Of course, any other conventional fasteners, such as nuts and bolts, may be used to mount the components to the mounting plate 10.

Enhanced versions of the automated waffle cone shaper may include additional optional features, such as an edge trim attached to an outer edge of the mounting plate 10 and a strain relief structure attached to the power cord 11. The enhanced versions may also include the power light 22 and run light 24 on the control box 18, while other more basic versions may not.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An automated waffle cone shaper for shaping waffle cones, the automated waffle cone shaper comprising:
    a mounting plate;
    a slide rail mounted to a top surface of the mounting plate, the slide rail including a slide carriage slidably mounted thereon;
    a tray attached to the slide carriage, such that when the slide carriage slides along a length of the slide rail, the tray moves along a length of the mounting plate, wherein the tray comprises a flat waffle feed portion and a cone shaper mold extending from the flat waffle feed portion, and the tray is configured to contain a waffle on the flat waffle feed portion;
    a motor and a gearbox operatively attached to an end of the mounting plate distal from the slide rail;
    a cone shaping spindle operatively attached to the motor, such that when the motor is activated, the cone shaping spindle rotates, wherein the cone shaping spindle is configured to pull the waffle into the cone shape mold from the flat waffle feed portion; and
    a return spring attaching the tray to a portion of the mounting plate distal from the slide rail,
    wherein:
        a first end of the return spring is attached to the tray via the slide carriage such that the first end of the spring moves along a length of the mounting plate with movement of the tray and the slide carriage; and
        a second end of the return spring is attached to a stationary point on the mounting plate proximate to the motor and the gearbox.

2. The automated waffle cone shaper of claim 1, further comprising:
    a motor shaft extending outward from the motor and the gearbox, the motor shaft designed to rotate when the motor is activated;
    a spindle shaft extending from an end of the cone shaping spindle proximate to the motor and the gearbox; and
    a shaft coupler attaching the motor shaft to the spindle shaft.

3. The automated waffle cone shaper of claim 1, wherein the cone shaping spindle has a size smaller than the cone shaper mold such that the cone shaping spindle fits within the cone shaper mold.

4. The automated waffle cone shaper of claim 1, further comprising a plurality of self-aligning feet attached to a bottom surface of the mounting plate.

5. The automated waffle cone shaper of claim 1, further comprising a control box operatively attached to the motor and gearbox.

6. The automated waffle cone shaper of claim 1, further comprising a photoelectric sensor operatively attached to the motor and gearbox.

7. The automated waffle cone shaper of claim 1, further comprising a cooling fan mounted to the mounting plate.

8. The automated waffle cone shaper of claim 7, wherein:
 a fan mounting frame surrounds the cooling fan; and
 the fan mounting frame is attached to the mounting plate.

9. The automated waffle cone shaper of claim 7, wherein the cooling fan is positioned such that the cooling fan blows air toward the cone shaping spindle and cone shaper mold during use.

* * * * *